(12) United States Patent
Kato (10) Patent No.: US 11,437,194 B2
(45) Date of Patent: Sep. 6, 2022

(54) MULTI-LAYER CERAMIC ELECTRONIC COMPONENT AND METHOD OF PRODUCING A MULTI-LAYER CERAMIC ELECTRONIC COMPONENT

(71) Applicant: TAIYO YUDEN CO., LTD., Tokyo (JP)

(72) Inventor: Yoichi Kato, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 128 days.

(21) Appl. No.: 16/874,581

(22) Filed: May 14, 2020

(65) Prior Publication Data
US 2020/0373087 A1 Nov. 26, 2020

(30) Foreign Application Priority Data

May 20, 2019 (JP) .............................. JP2019-094616

(51) Int. Cl.
| | | |
|---|---|---|
| *H01G 4/30* | (2006.01) | |
| *H01G 4/008* | (2006.01) | |
| *H01G 4/248* | (2006.01) | |
| *H01G 4/232* | (2006.01) | |
| *H01G 4/12* | (2006.01) | |

(52) U.S. Cl.
CPC ............... *H01G 4/30* (2013.01); *H01G 4/008* (2013.01); *H01G 4/2325* (2013.01); *H01G 4/248* (2013.01); *H01G 4/1227* (2013.01)

(58) Field of Classification Search
CPC ........ H01G 4/012; H01G 4/1227; H01G 4/33; H01G 4/248; H01G 4/224; H01G 4/2325; H01G 4/30; H01G 4/14; H01G 4/008; H01G 4/1236; H01G 4/1245
See application file for complete search history.

(56) References Cited

U.S. PATENT DOCUMENTS

| | | | | |
|---|---|---|---|---|
| 2014/0301012 A1* | 10/2014 | Kim | ..................... | H01G 4/1209 361/301.4 |
| 2014/0301015 A1* | 10/2014 | Kim | ....................... | H01G 4/012 361/301.4 |
| 2017/0040111 A1* | 2/2017 | Kim | ......................... | H01G 4/12 |
| 2018/0182555 A1* | 6/2018 | Kowase | ................... | H01G 4/12 |
| 2019/0180935 A1* | 6/2019 | Kato | ..................... | H01G 4/224 |

FOREIGN PATENT DOCUMENTS

JP    2012209539 A    10/2012

* cited by examiner

*Primary Examiner* — Michael P McFadden
(74) *Attorney, Agent, or Firm* — Law Office of Katsuhiro Arai (57) ABSTRACT

A multi-layer ceramic electronic component includes a multi-layer unit and a side margin. The multi-layer unit includes ceramic layers laminated in a first direction, and internal electrodes disposed between the ceramic layers, positions of end portions of the internal electrodes in a second direction orthogonal to the first direction being aligned with one another within a range of 0.5 μm in the second direction. The side margin includes a center portion in the first direction and a third direction orthogonal to the first direction and the second direction, and corner portions in the first direction and the third direction, the corner portions having a lower porosity than a porosity of the center portion, the side margin covering the multi-layer unit from the second direction.

6 Claims, 9 Drawing Sheets

MULTI-LAYER CERAMIC ELECTRONIC COMPONENT AND METHOD OF PRODUCING A MULTI-LAYER CERAMIC ELECTRONIC COMPONENT

BACKGROUND ART

The present disclosure relates to a multi-layer ceramic electronic component including side margins and to a method of producing the multi-layer ceramic electronic component.

A multi-layer ceramic electronic component such as a multi-layer ceramic capacitor typically includes a functional unit that includes internal electrodes laminated with ceramic layers being sandwiched therebetween, and side margins that protect side portions of the internal electrodes. For a method of producing such a multi-layer ceramic electronic component, a technique of producing an unsintered multi-layer unit including internal electrodes and ceramic green sheets and then providing side margins thereto is known from the viewpoint of thinning the side margins and increasing an intersectional area of the internal electrodes, for example.

For example, Japanese Patent Application Laid-open No. 2012-209539 discloses a method of producing a multi-layer ceramic electronic component, in which a ceramic green sheet for side surfaces is attached to a side surface of a green chip, which includes internal electrodes exposed from the side surface, to form a raw ceramic protective layer.

SUMMARY OF THE INVENTION

The multi-layer ceramic electronic component produced by the production method described above can be configured to have thin side margins, whereas it has a problem that cracks and damage due to an external impact are likely to occur particularly in the corner portions of the side margins. In the case where cracks and damage occur in the side margins, insulation degradation occurs and the reliability of the multi-layer ceramic electronic component decreases.

In view of the circumstances as described above, it is desirable to provide a multi-layer ceramic electronic component having high reliability and a method of producing the multi-layer ceramic electronic component.

Additional or separate features and advantages of the disclosure will be set forth in the descriptions that follow and in part will be apparent from the description, or may be learned by practice of the disclosure. The objectives and other advantages of the disclosure will be realized and attained by the structure particularly pointed out in the written description and claims thereof as well as the appended drawings.

To achieve these and other advantages and in accordance with the purpose of the present disclosure, as embodied and broadly described, in one aspect, the present disclosure provides a multi-layer ceramic electronic component including a multi-layer unit and a side margin.

The multi-layer unit includes ceramic layers laminated in a first direction, and internal electrodes disposed between the ceramic layers, positions of end portions of the internal electrodes in a second direction orthogonal to the first direction being aligned with one another within a range of 0.5 µm in the second direction.

The side margin covers the multi-layer unit from the second direction.

Further, the side margin includes a center portion in the first direction and a third direction orthogonal to the first direction and the second direction, and corner portions in the first direction and the third direction, the corner portions having a lower porosity than a porosity of the center portion.

In this configuration, the corner portions of the side margin are dense and have a lower porosity than the porosity of the center portion. This can suppress cracks and damage particularly in the corner portions that are likely to receive an external impact. Therefore, even when the side margin is thinned, the mechanical strength and moisture resistance of the multi-layer ceramic electronic component can be enhanced to suppress insulation degradation and thus enhance the reliability of the multi-layer ceramic electronic component.

Specifically, the corner portions may have a porosity of 3% or less.

Further, the center portion may have a porosity of 2% or more, and the corner portions may have a porosity of 1% or less.

This sufficiently reduces the porosity of the corner portions and can reliably suppress the insulation degradation and further enhance the reliability of the multi-layer ceramic electronic component.

The side margin may have a thickness of 30 µm or less in the second direction.

This makes it possible to thin the side margin and miniaturize the multi-layer ceramic electronic component. Further, this makes it possible to ensure the intersectional area of the internal electrodes and to achieve a multi-layer ceramic electronic component having a small size and a large capacitance.

The side margin may include a circumferential portion including the corner portions and surrounding the center portion in the first direction and the third direction, and the circumferential portion may have a smaller porosity than a porosity of the center portion.

With this configuration, the circumferential portion including the corner portions becomes dense, which can further improve the mechanical strength and the moisture resistance of the side margin. Therefore, the reliability of the multi-layer ceramic electronic component can further be enhanced.

In another aspect, the present disclosure provides a method of producing a multi-layer ceramic electronic component, the method including: producing a multi-layer chip including ceramic layers laminated in a first direction, and internal electrodes disposed between the ceramic layers and exposed from a side surface of the multi-layer chip, the side surface facing in a second direction orthogonal to the first direction; and forming a side margin on the side surface of the multi-layer chip, the side margin including a center portion in the first direction and a third direction orthogonal to the first direction and the second direction, and corner portions in the first direction and the third direction, the corner portions having a lower porosity than a porosity of the center portion.

The forming a side margin may include forming an untreated side margin on the side surface of the multi-layer chip, the untreated side margin being formed of unsintered ceramics, and pressuring, from the second direction, corner portions of the untreated side margin in the first direction and the third direction.

Thus, the corner portions of the untreated side margin are compressed by pressure treatment, and a powder filling rate of the corner portions rises. Therefore, the corner portions are sintered to have a high powder filling rate and can be sintered to be dense and have a low porosity.

As described above, according to the present disclosure, it is possible to provide a multi-layer ceramic electronic component having high reliability and a method of producing the multi-layer ceramic electronic component.

These and other objects, features and advantages of the present disclosure will become more apparent in light of the following detailed description of embodiments thereof, as illustrated in the accompanying drawings.

It is to be understood that both the foregoing general description and the following detailed description are exemplary and explanatory, and are intended to provide further explanation of the disclosure as claimed.

DETAILED DESCRIPTION OF THE EMBODIMENTS

Hereinafter, embodiments of the present disclosure will be described with reference to the drawings.

In the figures, an X axis, a Y axis, and a Z axis orthogonal to one another are shown as appropriate. The X axis, the Y axis, and the Z axis are common in all figures.

First Embodiment

1. Configuration of Multi-Layer Ceramic Capacitor 10

Figure 1:
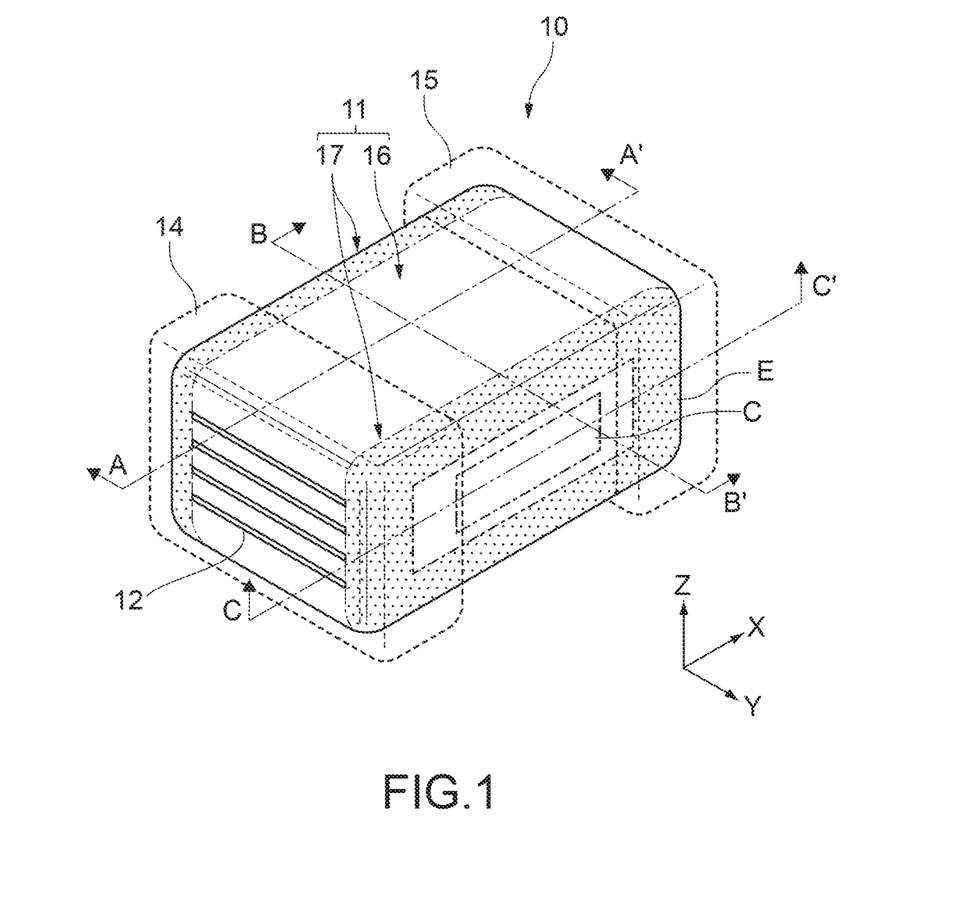
FIG. 1 is a perspective view of a multi-layer ceramic capacitor according to a first embodiment of the present disclosure.
Figure 2:
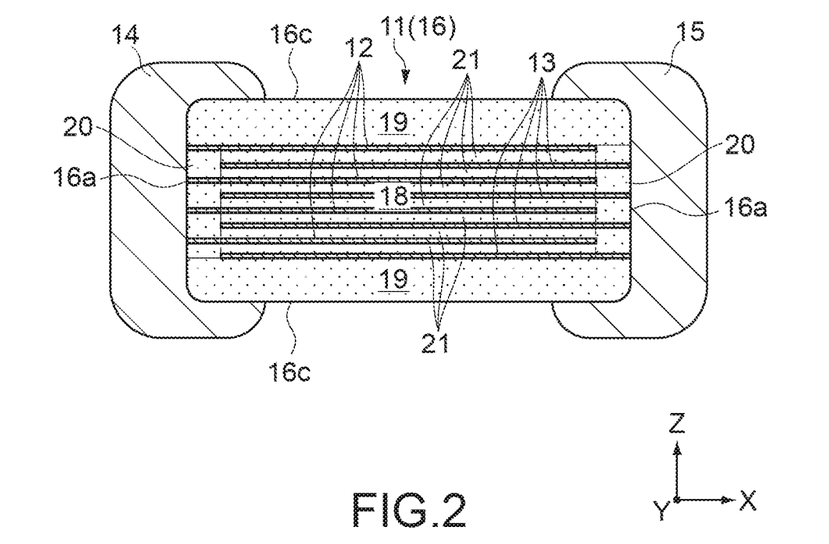
FIG. 2 is a cross-sectional view of the multi-layer ceramic capacitor taken along the A-A' line in FIG. 1.
Figure 3:
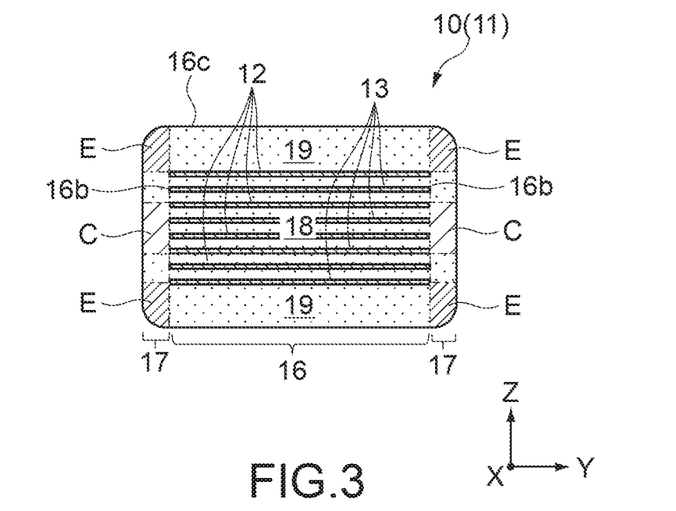
FIG. 3 is a cross-sectional view of the multi-layer ceramic capacitor taken along the B-B' line in FIG. 1.
Figure 4:
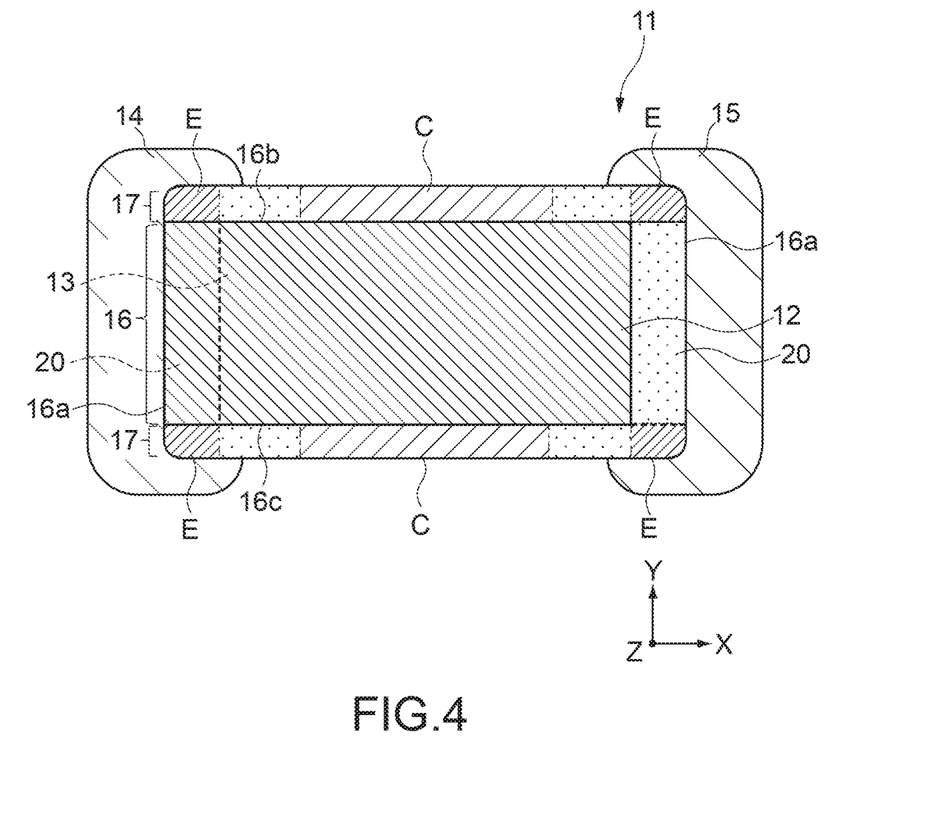
FIG. 4 is a cross-sectional view of the multi-layer ceramic capacitor taken along the C-C' line in FIG. 1.

FIGS. 1 to 4 each show a multi-layer ceramic capacitor 10 according to a first embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1. FIG. 4 is a cross-sectional view of the multi-layer ceramic capacitor 10 taken along the C-C' line in FIG. 1.

The multi-layer ceramic capacitor 10 includes a ceramic body 11, a first external electrode 14, and a second external electrode 15. FIG. 1 shows the first and second external electrodes 14 and 15 in broken lines. The ceramic body 11 typically has two main surfaces facing in the Z-axis direction, two end surfaces facing in the X-axis direction, and two side surfaces facing in the Y-axis direction.

It should be noted that ridges connecting the surfaces of the ceramic body 11 may be rounded.

The first external electrode 14 and the second external electrode 15 cover the end surfaces of the ceramic body 11 and face each other in the X-axis direction while sandwiching the ceramic body 11 therebetween. The first external electrode 14 and the second external electrode 15 extend to the main surfaces and the side surfaces from the end surfaces of the ceramic body 11. With this configuration, the first external electrode 14 and the second external electrode 15 have U-shaped cross sections parallel to the X-Z plane and the X-Y plane. It should be noted that the shapes of the first and second external electrodes 14 and 15 are not limited to those shown in FIG. 1.

The first and second external electrodes 14 and 15 are each formed of a good conductor of electricity. Examples of the good conductor of electricity forming the first and second external electrodes 14 and 15 include a metal mainly containing copper (Cu), nickel (Ni), tin (Sn), palladium (Pd), platinum (Pt), silver (Ag), gold (Au), or the like and an alloy of those metals.

The ceramic body 11 includes a multi-layer unit 16 and side margins 17. The multi-layer unit 16 has two end surfaces 16a facing in the X-axis direction, two side surfaces 16b facing in the Y-axis direction, and two main surfaces 16c facing in the Z-axis direction.

The multi-layer unit 16 includes a capacitance forming unit 18, covers 19 provided to both sides of the capacitance forming unit 18 in the Z-axis direction, and end margins 20 provided on both sides of the capacitance forming unit 18 in the X-axis direction. The capacitance forming unit 18 is configured as a functional unit in this embodiment.

The capacitance forming unit 18 includes first internal electrodes 12 and second internal electrodes 13, which are alternately laminated in the Z-axis direction while sandwiching ceramic layers 21 (see FIG. 2). The first internal electrodes 12 and the second internal electrodes 13 are each formed of a good conductor of electricity. Examples of the good conductor of electricity forming the first and second internal electrodes 12 and 13 typically include nickel (Ni), and in addition thereto, include a metal mainly containing copper (Cu), palladium (Pd), platinum (Pt), silver (Ag), gold (Au), or the like and an alloy of those metals.

The first internal electrodes 12 and the second internal electrodes 13 each have a sheet-like shape extending along the X-Y plane. The first internal electrodes 12 are drawn to one of the end surfaces 16a of the multi-layer unit 16 and connected to the first external electrode 14. The second internal electrodes 13 are drawn to the other end surface 16a of the multi-layer unit 16 and connected to the second external electrode 15. With this configuration, when a voltage is applied between the first external electrode 14 and the second external electrode 15, the voltage is applied to the ceramic layers 21 between the first internal electrodes 12 and the second internal electrodes 13. This allows the capacitance forming unit 18 to store charge corresponding to the voltage described above.

In the multi-layer unit 16, in order to increase capacitances of the respective ceramic layers 21 provided between the first internal electrodes 12 and the second internal electrodes 13, dielectric ceramics having a high dielectric constant is used. Examples of the dielectric ceramics having a high dielectric constant include a material having a Perovskite structure containing barium (Ba) and titanium (Ti), which is typified by barium titanate ($BaTiO_3$).

It should be noted that the ceramic layers 21 may be formed of a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, a titanium oxide ($TiO_2$) based material, or the like.

The covers 19 are formed of insulating ceramics, and ensure insulation properties of the capacitance forming unit 18 in the Z-axis direction and also protect the capacitance forming unit 18.

The end margins 20 are formed of insulating ceramics and are provided between the capacitance forming unit 18 and each of the first and second external electrodes 14 and 15. In other words, the end margins 20 are provided between the first internal electrodes 12 and the end surface 16a to which the first internal electrodes 12 are not drawn, and between the second internal electrodes 13 and the end surface 16a to which the second internal electrodes 13 are not drawn. The end margins 20 ensure insulation properties between the first internal electrodes 12 and the second external electrode 15 and ensure insulation properties between the second internal electrodes 13 and the first external electrode 14.

The insulating ceramics used for the end margins 20 and the covers 19 may include dielectric ceramics used for the ceramic layers 21. This suppresses internal stress that may occur between the capacitance forming unit 18, and the end margins 20 and the covers 19.

The first and second internal electrodes 12 and 13 are formed over the entire width of the capacitance forming unit 18 in the Y-axis direction and are exposed from both the side surfaces 16b of the multi-layer unit 16. The positions of end portions of the first and second internal electrodes 12 and 13 are aligned with one another within a range of 0.5 µm in the Y-axis direction. From the viewpoint of ensuring insulation properties between the first and second internal electrodes 12 and 13 and between those internal electrodes and the outside thereof, for example, side margins 17 are provided to both the side surfaces 16b.

2. Configuration of Side Margin 17

The side margins 17 cover the two side surfaces 16b of the multi-layer unit 16. While the side margins 17 are also formed of insulating ceramics, the side margins 17 may be formed of dielectric ceramics used for the ceramic layers 21 from the viewpoint of suppressing internal stress, for example, similar to the covers 19 and the end margins 20.

The side margins 17 are configured to be very thin in this embodiment. Specifically, the side margins 17 are configured to have a thickness of 30 µm or less in the Y-axis direction. This makes it possible to miniaturize the multi-layer ceramic capacitor 10 and also to sufficiently ensure the intersectional area of the first and second internal electrodes 12 and 13 to achieve an increase in capacitance.

As shown in FIGS. 1, 3, and 4, each of the side margins 17 includes a center portion C in the Z- and X-axis directions and a circumferential portion E that surrounds the center portion C in the Z- and X-axis directions. The center portion C and the circumferential portion E are regions within the side margin 17, which are defined from the viewpoint of porosity to be described later. FIG. 1 shows the circumferential portions E in a dot pattern. FIGS. 3 and 4 show the circumferential portions E in high-density diagonal lines and the center portions C in low-density diagonal lines.

As shown in FIG. 1, the circumferential portion E is defined as a region that annularly surrounds the circumference of the side margin 17. An interface of the circumferential portion E inward in the Z-axis direction is assumed to coincide with, as shown in FIG. 3, a surface extending in the Y-axis direction from an interface between the capacitance forming unit 18 and the cover 19. Similarly, an interface of the circumferential portion E inward in the X-axis direction is assumed to coincide with, as shown in FIG. 4, a surface extending in the Y-axis direction from an interface between the capacitance forming unit 18 and the end margin 20. Further, an interface of the circumferential portion E inward in the Y-axis direction is assumed to coincide with an interface between the side margin 17 and the multi-layer unit 16.

As shown in FIG. 1, the center portion C is defined as a region having a substantially rectangular planar shape whose center is at the center point of the side margin 17 in the Z-axis direction and the X-axis direction when viewed from the Y-axis direction. Specifically, the center portion C is assumed as a region having a dimension of 50% of the dimension of the side margin 17 in the Z-axis direction, with an imaginary line that divides the side margin 17 in two in the Z-axis direction being at the center in the Z-axis direction. Similarly, the center portion C is assumed as a region having a dimension of 50% of the dimension of the side margin 17 in the X-axis direction, with an imaginary line that divides the side margin 17 in two in the X-axis direction being at the center in the X-axis direction. It should be noted that an interface of the center portion C inward in the Y-axis direction is assumed to coincide with an interface between the side margin 17 and the multi-layer unit 16.

In this embodiment, the circumferential portion E and the center portion C are compared with each other in terms of porosity. The porosity is calculated by, for example, the following procedure. First, cross sections of the circumferential portion E and the center portion C of the side margin 17 are imaged with a scanning electron microscope (SEM) at a predetermined magnification (for example, at the magnification of 10,000). The cross sections of the circumferential portion E and the center portion C are each imaged at a plurality of sites (for example, five sites). Next, a cross-sectional area of a pore in each of the images, which are obtained by imaging the cross sections of the circumferential portion E and the center portion C, is measured. From the cross-sectional areas of the pores in the plurality of images, a mean value of the cross-sectional areas of the pores in the circumferential portion E and a mean value of the cross-sectional areas of the pores in the center portion C are calculated. Pores for which a mean value of the cross-sectional areas is to be measured have a size of 40 to 800 nm in a diameter converted value. The diameter converted value of a certain pore means a numerical value of the diameter of a circle having the same area as the cross-sectional area of the pore. Image processing software is used as appropriate for processing of measuring the cross-sectional area of a pore or the like. Subsequently, on the basis of the ratio of the mean value to the cross-sectional area of each of the circumferential portion E and the center portion C, the porosity in the circumferential portion E and the porosity in the center portion C are calculated.

In this embodiment, the circumferential portion E is configured to have a smaller porosity that that of the center portion C. With this configuration, the circumferential portion E has a higher denseness of ceramics and a higher mechanical strength than those of the center portion C. Therefore, in the circumferential portion E, cracks and damage due to an external impact are suppressed. Further, in the circumferential portion E, entering of moisture via cracks and pores is suppressed, and moisture resistance is also enhanced. Therefore, according to the multi-layer ceramic capacitor 10, insulation degradation can be suppressed in the circumferential portion E that is likely to receive an external impact, and a highly reliable configuration can be obtained.

Specifically, the circumferential portion E favorably has a porosity of 3% or less and more favorably 1% or less. This can sufficiently enhance the mechanical strength and the moisture resistance of the circumferential portion E.

In the case where the circumferential portion E has a porosity of 1% or less, the porosity of the center portion C can be set to, for example, 2% or more.

Further, the porosity of the circumferential portion E can be set to be smaller than the porosity of the center portion C by 1% or more, for example. With this configuration, the porosity of the circumferential portion E can be sufficiently reduced.

The multi-layer ceramic capacitor 10 configured as described above is produced as follows.

3. Method of Producing Multi-Layer Ceramic Capacitor 10

Figure 5:
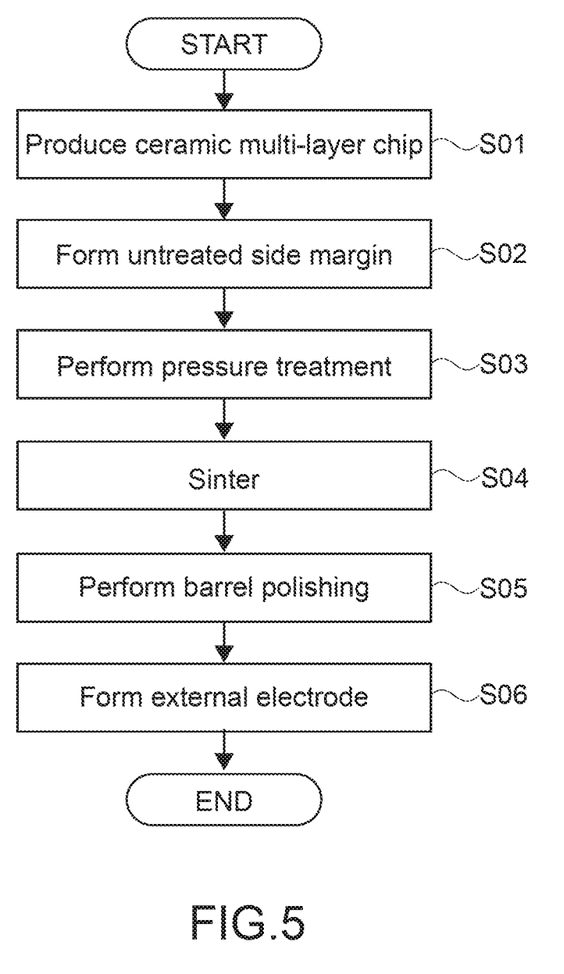
FIG. 5 is a flowchart showing a method of producing the multi-layer ceramic capacitor.

FIG. 5 is a flowchart showing a method of producing the multi-layer ceramic capacitor 10. FIGS. 6 to 10 are views each schematically showing a production process of the multi-layer ceramic capacitor 10. Hereinafter, the method of producing the multi-layer ceramic capacitor 10 will be described according to FIG. 5 with reference to FIGS. 6 to 10 as appropriate.

3.1 Step S01: Production of Ceramic Multi-Layer Chip 116

In Step S01, first ceramic sheets 101 and second ceramic sheets 102 for forming the capacitance forming unit 18, and third ceramic sheets 103 for forming the covers 19 are laminated and cut to produce an unsintered ceramic multi-layer chip (multi-layer chip) 116.

Figure 6:
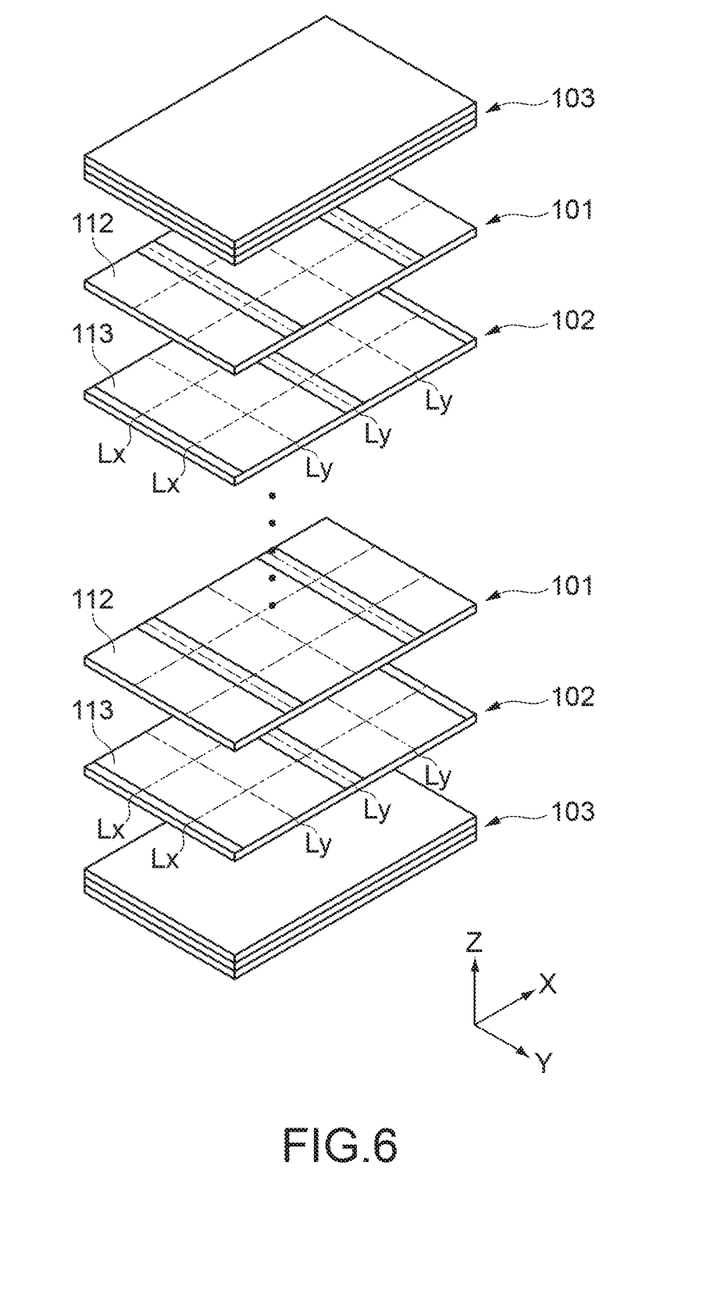
FIG. 6 is a perspective view showing a production process of the multi-layer ceramic capacitor.

The first, second, and third ceramic sheets 101, 102, and 103 shown in FIG. 6 are configured as unsintered dielectric green sheets including dielectric ceramics as a main component. Unsintered first internal electrodes 112 corresponding to the first internal electrodes 12 are formed on the first ceramic sheets 101. Unsintered second internal electrodes 113 corresponding to the second internal electrodes 13 are formed on the second ceramic sheets 102. The internal electrodes are not formed on the third ceramic sheets 103.

Each of the first and second internal electrodes 112 and 113 has a plurality of belt-like electrode patterns, which extend across cutting lines Lx parallel to the X-axis direction and along cutting lines Ly parallel to the Y-axis direction. Those first and second internal electrodes 112 and 113 are formed by applying an electrically conductive paste to the first and second ceramic sheets 101 and 102 by printing or the like.

As shown in FIG. 6, the first and second ceramic sheets 101 and 102 are alternately laminated in the Z-axis direction. The laminate of the first and second ceramic sheets 101 and 102 corresponds to the capacitance forming unit 18. The third ceramic sheets 103 are laminated on the upper and lower surfaces of the laminate of the first and second ceramic sheets 101 and 102 in the Z-axis direction. The laminate of the third ceramic sheets 103 corresponds to the cover 19.

It should be noted that the number of first, second, and third ceramic sheets 101, 102, and 103 laminated or the like can be adjusted as appropriate.

Figure 7:
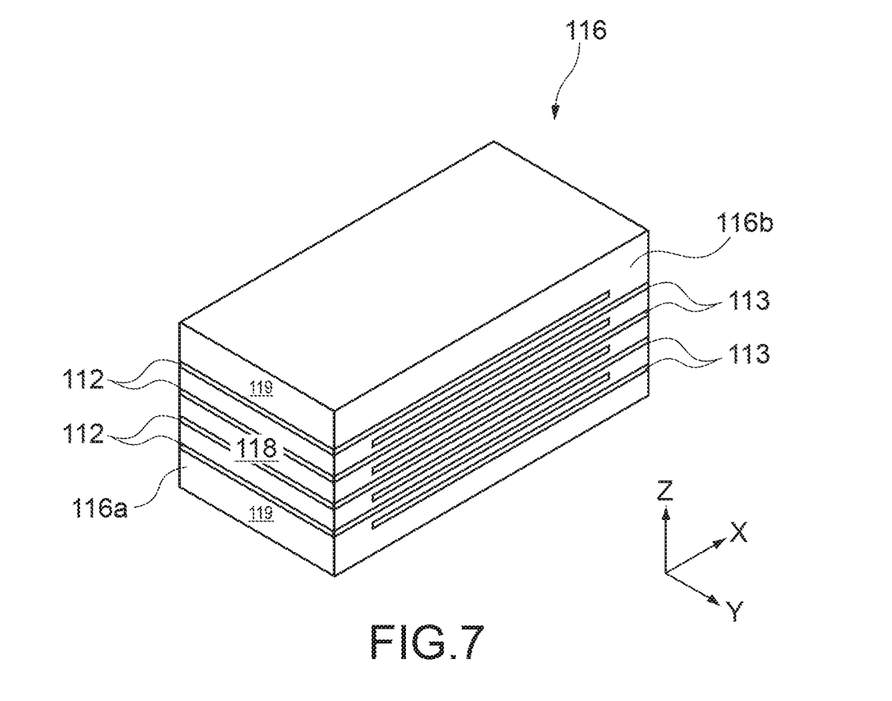
FIG. 7 is a perspective view showing a production process of the multi-layer ceramic capacitor.

Subsequently, the laminate of the first, second, and third ceramic sheets 101, 102, and 103 is pressure-bonded in the Z-axis direction and cut along the cutting lines Lx and Ly. Thus, a multi-layer chip 116 shown in FIG. 7 is produced.

The multi-layer chip 116 includes an unsintered capacitance forming unit 118 including the unsintered internal electrodes 112 and 113, and unsintered covers 119. The multi-layer chip 116 has side surfaces 116b, which are cut surfaces corresponding to the cutting lines Lx, and end surfaces 116a, which are cut surfaces corresponding to the cutting lines Ly. End portions of the unsintered internal electrodes 112 and 113 are exposed from the side surfaces 116b.

3.2 Step S02: Formation of Untreated Side Margin 117u

In Step S02, untreated side margins 117u are formed on the side surfaces 116b of the multi-layer chip 116. The untreated side margins 117u are side margins before being subjected to pressure treatment to be described later.

The untreated side margins 117u are formed of unsintered ceramics, specifically, ceramic sheets or ceramic slurry. The untreated side margins 117u can be formed by, for example, attaching ceramic sheets to the side surfaces 116b of the multi-layer chip 116. Alternatively, the untreated side margins 117u can also be formed by coating the side surfaces 116b of the multi-layer chip 116 with ceramic slurry by application or dipping, for example.

Figure 8:
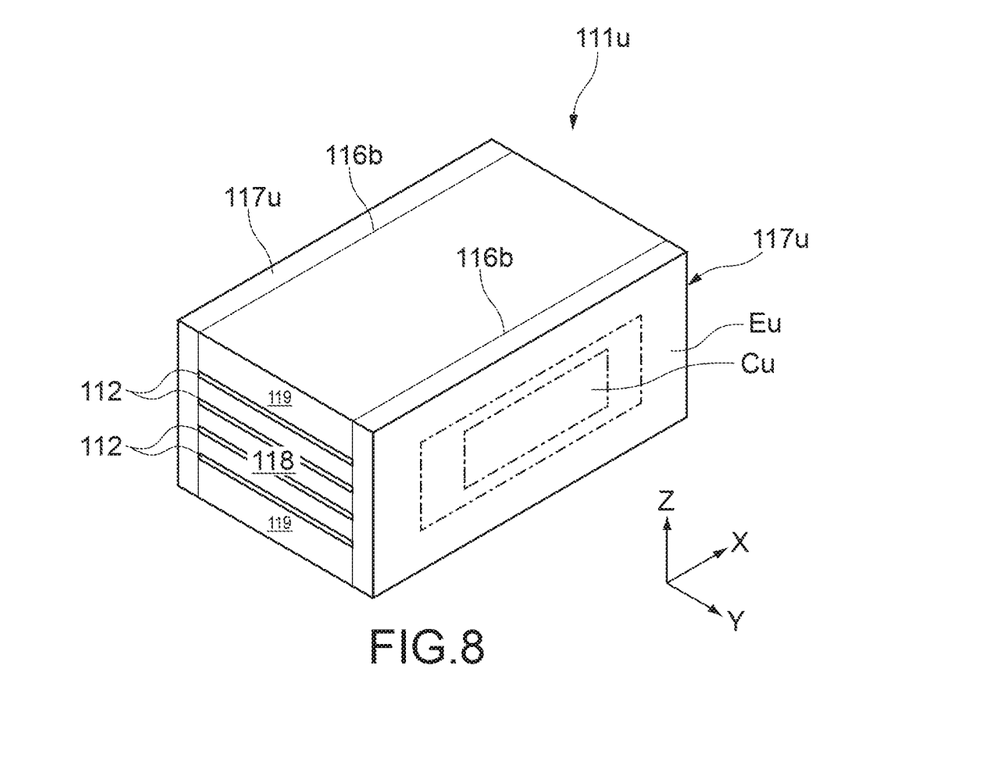
FIG. 8 is a perspective view showing a production process of the multi-layer ceramic capacitor.

Thus, as shown in FIG. 8, an untreated body 111u in which the untreated side margins 117u are formed on the side surfaces 116b of the multi-layer chip 116 is produced.

In each of the untreated side margins 117u, a center portion Cu in the Z- and X-axis directions and a circumferential portion Eu in the Z- and X-axis directions are defined in a manner similar to the center portion C and the circumferential portion E described above. Note that each untreated side margin 117u includes pores between ceramic particles at a substantially uniform density as a whole. In other words, in the untreated side margin 117u, the porosity of the circumferential portion Eu and the porosity of the center portion Cu are substantially the same. In this embodiment, the following pressure treatment is performed on the untreated side margin 117u to reduce the porosity of the circumferential portion Eu.

3.3 Step S03: Pressure Treatment

In Step S03, the circumferential portion Eu of the untreated side margin 117u is pressured from the Y-axis direction.

Figure 9:
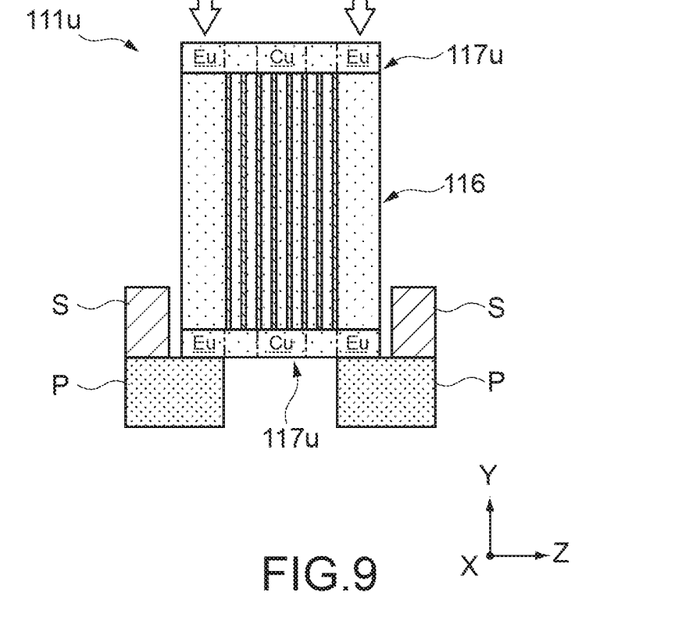
FIG. 9 is a cross-sectional view showing a production process of the multi-layer ceramic capacitor.

FIG. 9 is a cross-sectional view schematically showing the pressure treatment in this embodiment. As shown in FIG. 9, in this embodiment, an elastic member P is disposed first. The elastic member P includes a substantially rectangular hole, which fits the shape of the center portion Cu of the untreated side margin 117u when viewed from the Y-axis direction. Next, the untreated body 111u is disposed on the elastic member P at a posture at which the Y-axis direction coincides with the vertical direction (pressure direction). The untreated body 111u is disposed at a position at which the circumferential portion Eu comes into contact with the elastic member P. The elastic member P can be selected as appropriate from a fluoro-rubber, a silicone rubber, and the like in consideration of elasticity.

A frame S for positioning may be disposed on the elastic member P. The frame S is designed such that its planar shape of an inner wall surface viewed from the Y-axis direction has a shape that fits the planar shape of the untreated side margin 117u viewed from the Y-axis direction. When the untreated body 111u is disposed within such a frame S, the untreated body 111u can be easily positioned with respect to the elastic member P, and the circumferential portion Eu can be accurately pressured. Further, when the planar shape of the frame S is designed to have the shape described above, the untreated body 111u can be easily arranged at a posture at which the untreated side margins 117u are disposed on the top and the bottom.

Next, the untreated body 111u disposed on the elastic member P and within the frame S is pressured downward in the Y-axis direction. The pressure method is not limited, and uniaxial pressing can be used, for example. Thus, the untreated body 111u is pressured downward in the Y-axis direction, and the circumferential portion Eu receives a drag from the elastic member P upward in the Y-axis direction.

By the pressure treatment, the circumferential portion Eu of the untreated side margin 117u is compressed, and a powder filling rate of the circumferential portion Eu rises. Meanwhile, since the center portion Cu does not receive a drag from the elastic member P, the powder filling rate does not rise even when the pressure is applied. Therefore, the powder filling rate of the circumferential portion Eu is higher than the powder filling rate of the center portion Cu. The powder filling rate of the circumferential portion Eu can be adjusted by the magnitude of the pressure, an elastic modulus of the elastic member P, and the like.

Figure 10:
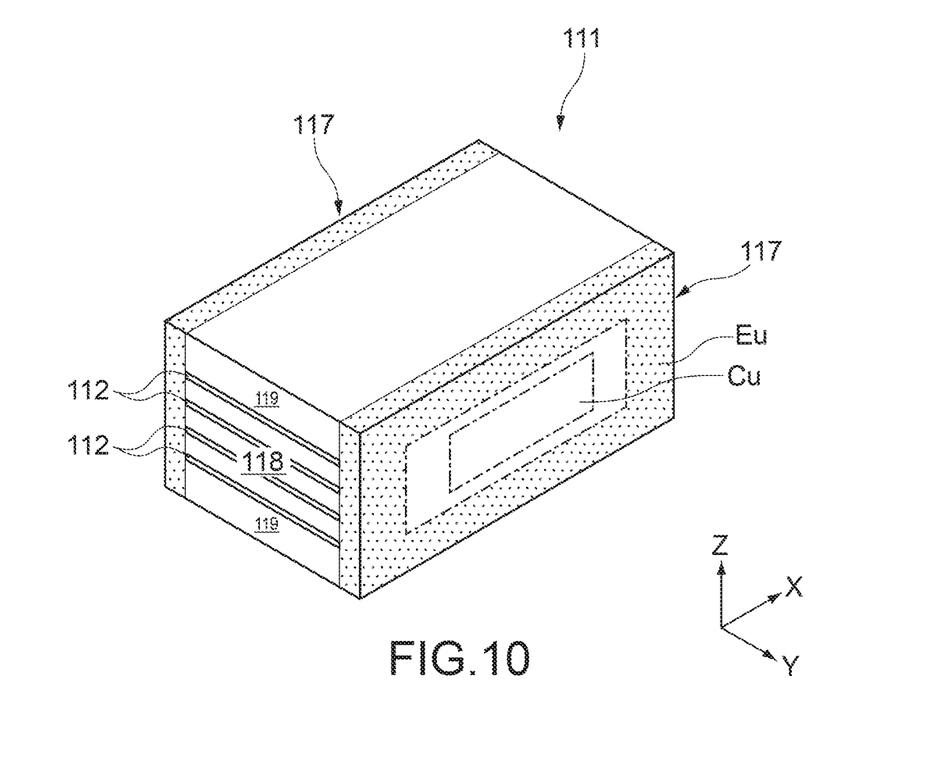
FIG. 10 is a perspective view showing a production process of the multi-layer ceramic capacitor.

As a result, as shown in FIG. 10, the unsintered side margins 117 in which the circumferential portions Eu have a higher powder filling rate than the powder filling rate of the center portions Cu are formed on the side surfaces 116b of the multi-layer chip 116, thus producing an unsintered ceramic body 111. FIG. 10 shows, as in FIG. 1, the circumferential portions Eu in a dot pattern.

3.4 Step S04: Sintering

In Step S04, the unsintered ceramic body 111 obtained in Step S03 is sintered. A sintering temperature in Step S04 can be determined on the basis of a sintering temperature of the unsintered ceramic body 111. Further, sintering can be performed in a reduction atmosphere or a low-oxygen partial pressure atmosphere, for example.

Through Step S04, the circumferential portions Eu having a high powder filling rate are sintered to be dense and have a low porosity. Meanwhile, the center portions Cu having a lower powder filling rate than the powder filling rate of the circumferential portions Eu are sintered to have a lower denseness than the denseness of the circumferential portions Eu. In other words, in this step, the circumferential portions E having a lower porosity than the porosity of the center portions C are formed.

3.5 Step S05: Barrel Polishing

In Step S05, barrel polishing is performed on the sintered ceramic body, and chamfering is then performed thereon. The barrel polishing is executed by, for example, putting a plurality of ceramic bodies into a barrel container, sealing it, and imparting rotational motions or vibrations to the barrel container. Together with the plurality of ceramic bodies, a polishing medium and liquid may be put and sealed into the barrel container. By the barrel polishing in this step, the ridges and corner portions connecting the surfaces are rounded, thus producing the ceramic body 11 as shown in FIGS. 1 to 4.

3.6 Step S06: Formation of External Electrode

In Step S06, the first external electrode 14 and the second external electrode 15 are formed in both the end portions of the ceramic body 11 in the X-axis direction obtained in Step S05. As an example, first, an electrically conductive paste is applied to both the end portions of the ceramic body 11 in the X-axis direction, and the electrically conductive pastes are baked to form base films. Next, the ceramic body 11 on which the base films are formed is dipped into a plating solution to perform electroplating, to form one or more plating films.

The multi-layer ceramic capacitor 10 as shown in FIGS. 1 to 4 is thus formed.

4. Example and Comparative Example

For Example and Comparative example of this embodiment, samples of the multi-layer ceramic capacitor 10 were produced by using the production method described above. In those samples, a dimension in the X-axis direction was set to 1 mm, and dimensions in the Y- and Z-axis directions were each set to 0.5 mm.

The pressure treatment of Step S03 was performed on each of the samples of Example such that the circumferential portion of each side margin had a lower porosity than the porosity of the center portion. The circumferential portion of the side margin had a porosity of 0.8% or less, and the center portion had a porosity of 3.0% or more.

On the other hand, Step S03 was not performed on the samples of Comparative example.

For each sample, an insulation resistance (IR) failure rate after the barrel polishing of S05 was evaluated. In this evaluation, a resistance value obtained after application of a rated voltage of 6 V was measured for each sample, and the samples having a resistance value of 1 M$\Omega$ or less were determined as defectives in which a short circuit occurred. The proportion of the samples, which were determined as defectives in which a short circuit occurred, in 1,000 samples of each of Example and Comparative example was calculated as a short-circuit occurrence rate after the barrel polishing.

As a result, in the samples of Comparative example, in each of which the porosity distribution was not formed in the side margins, the short-circuit occurrence rate after barrel polishing was 5%. Thus, it was confirmed that the samples of Comparative example have cracks and damage in the circumferential portions of the side margins due to barrel polishing, and insulation degradation is likely to occur.

Meanwhile, in the samples of Example, the short-circuit occurrence rate after barrel polishing was 0%. Thus, it was confirmed that the samples of Example include the dense circumferential portions of the side margins, and cracks and damage are less likely to occur even after the barrel polishing.

In addition, the samples of Example and Comparative example determined that a short circuit did not occur after the barrel polishing were dropped from a height of 30 cm from a floor to calculate the short-circuit occurrence rate again. Specifically, a resistance value obtained after each sample was dropped was measured, and a proportion of the samples having a resistance value of 1 M$\Omega$ or less, in 1,000 samples of each of Example and Comparative example, was calculated as a short-circuit occurrence rate after the drop test.

As a result, in the samples of Comparative example, the short-circuit occurrence rate after the drop test was 3%. Meanwhile, in the samples of Example, the short-circuit occurrence rate after the drop test was 0%.

Thus, it was confirmed that the samples of Example have the circumferential portions that have a low porosity and are dense, and thus have a high resistance to an external impact such as drop and have a highly reliable configuration that is less likely to cause insulation degradation.

II Second Embodiment

In the side margin, the strength in the circumferential portion, particularly in the corner portions is important.

In this regard, in this embodiment, a configuration in which the corner portions of the side margins have a low porosity will be described.

Figure 11:
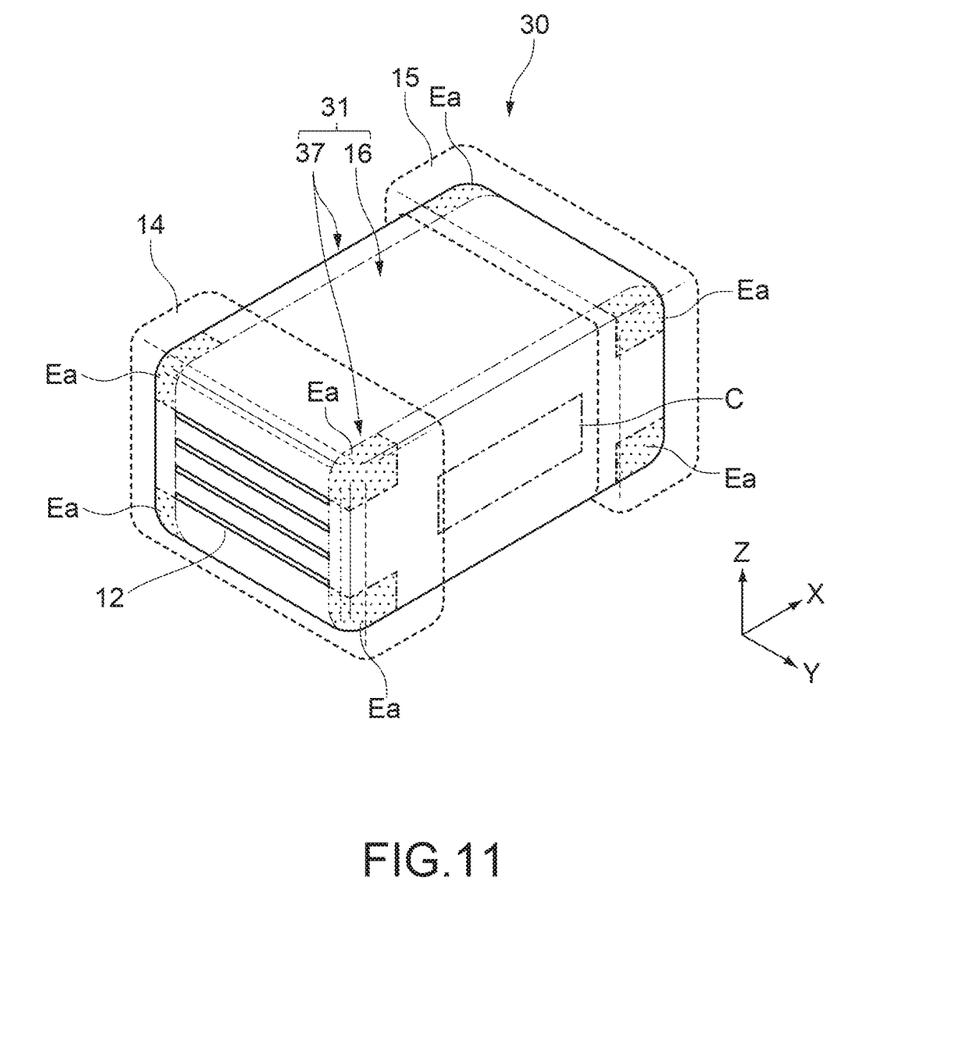
FIG. 11 is a perspective view of a multi-layer ceramic capacitor according to a second embodiment of the present disclosure.

FIG. 11 is a perspective view of a multi-layer ceramic capacitor 30 according to a second embodiment of the present disclosure.

In the following description, configurations similar to those in the first embodiment described above will be denoted by the same reference symbols, and description thereof will be omitted.

The multi-layer ceramic capacitor 30 includes a ceramic body 31, a first external electrode 14, and a second external electrode 15. FIG. 11 shows the first and second external electrodes 14 and 15 in broken lines. The ceramic body 31 includes a multi-layer unit 16 similar to that of the first embodiment, and side margins 37 different from those of the first embodiment.

Each of the side margins 37 includes corner portions Ea and a center portion C. FIG. 11 shows the corner portions Ea in a dot pattern.

The corner portions Ea are included in a circumferential portion E and constitute the corners (four corners) of each side margin 37 in the Z-axis direction and the X-axis direction. In other words, in each side margin 37, four corner portions Ea are defined. An interface of each corner portion Ea inward in the Z-axis direction is assumed to coincide with a surface extending in the Y-axis direction and the X-axis direction from an interface between the capacitance forming unit 18 and the cover 19. Similarly, an interface of each corner portion Ea inward in the X-axis direction is assumed to coincide with a surface extending in the Y-axis direction and the Z-axis direction from an interface between the capacitance forming unit 18 and the end margin 20. Further, an interface of each corner portion Ea inward in the Y-axis direction is assumed to coincide with an interface between the side margin 37 and the multi-layer unit 16.

As in the first embodiment, the center portion C is defined as a region having a substantially rectangular planar shape whose center is at the center point in the Z-axis direction and the X-axis direction when viewed from the Y-axis direction.

In this embodiment, the corner portions Ea are configured to have a smaller porosity than the porosity of the center portion C.

Specifically, the corner portions Ea favorably have a porosity of 3% or less and more favorably 1% or less. This can sufficiently enhance the mechanical strength and the moisture resistance in the corner portions Ea.

In the case where the corner portions Ea have a porosity of 1% or less, the porosity of the center portions C can be set to, for example, 2% or more.

Further, the porosity of the corner portions Ea can be set to be smaller than the porosity of the center portions C by 1% or more, for example. This can sufficiently reduce the porosity of the corner portions Ea.

With such a configuration, in the multi-layer ceramic capacitor 30, the corner portions Ea have a higher denseness of ceramics and also have a higher mechanical strength and moisture resistance. Therefore, by the multi-layer ceramic capacitor 30, insulation degradation in the corner portions Ea that are particularly likely to receive an external impact can be suppressed, and a configuration with a high reliability can be obtained.

The multi-layer ceramic capacitor 30 having the configuration described above is produced through the steps similar to those for the multi-layer ceramic capacitor 10 described above. Note that the side margins 37 are formed by pressuring only the corner portions Ea from the Y-axis direction in the pressure treatment of Step S03.

Figure 12:
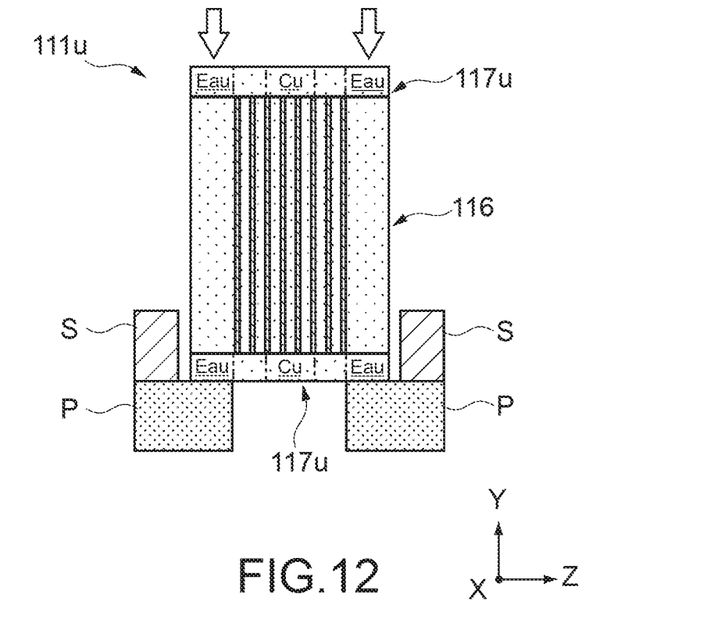
FIG. 12 is a cross-sectional view showing a production process of the multi-layer ceramic capacitor.

FIG. 12 is a cross-sectional view schematically showing the pressure treatment of Step S03 in this embodiment. As shown in FIG. 12, in this embodiment, an elastic member P is disposed to come into contact with only corner portions Eau of an untreated side margin 117u of an untreated body 111u that is disposed at a posture at which the Y-axis direction is the vertical direction. With this configuration, if the untreated body 111u is pressured downward in the Y-axis direction, the corner portions Eau of the untreated side margin 117u are compressed, and a powder filling rate of the corner portions Eau rises. Meanwhile, since the other region including the center portion Cu does not receive a drag from the elastic member P, the powder filling rate does not rise even when the pressure is applied. Therefore, the powder filling rate of the corner portions Eau is higher than the powder filling rate of the center portion Cu.

Figure 13:
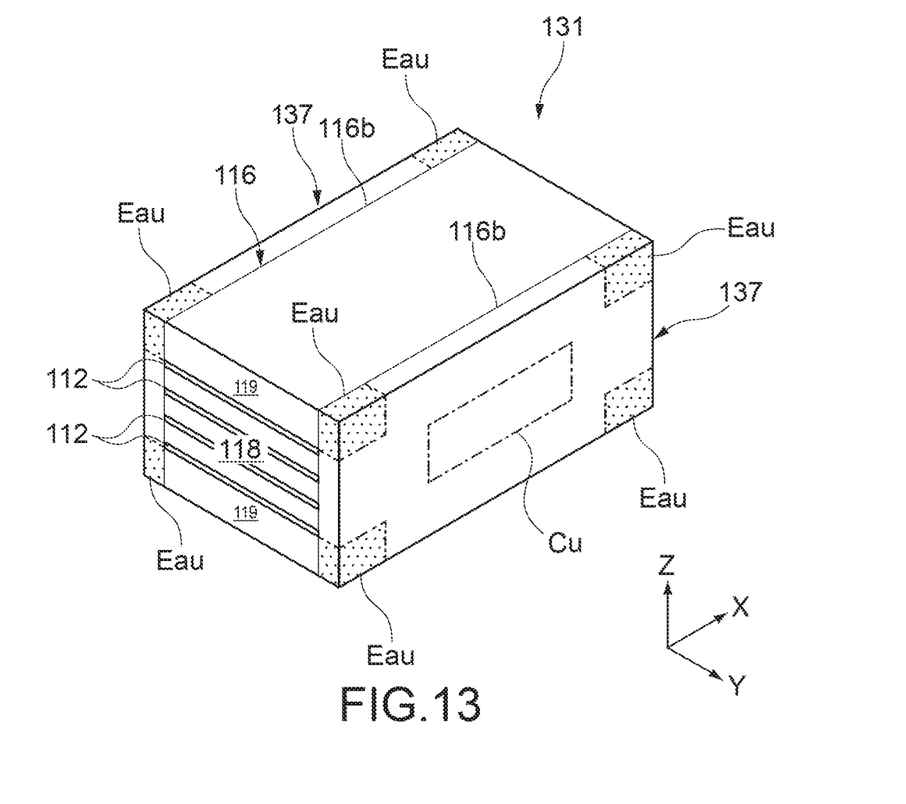
FIG. 13 is a perspective view showing a production process of the multi-layer ceramic capacitor.

By this treatment, as shown in FIG. 13, unsintered side margins 137 in each of which the corner portions Eau have a higher powder filling rate than the powder filling rate of the center portion Cu are formed on the side surfaces 116b of the multi-layer chip 116, thus producing an unsintered ceramic body 131. This ceramic body 131 is subjected to sintering and barrel polishing, and the first and second external electrodes 14 and 15 are formed on both end portions of the ceramic body 131 in the X-axis direction, to thus produce the multi-layer ceramic capacitor 30. In other words, the corner portions Eau having a high powder filling rate are densified by sintering, and the corner portions Ea having a low porosity are formed. FIG. 13 shows, as in FIG. 11, the corner portions Eau in a dot pattern.

Hereinabove, the embodiments of the present disclosure have been described, but the present disclosure is not limited to the embodiments described above. It should be appreciated that the present disclosure may be variously modified without departing from the gist of the present disclosure.

In the embodiments described above, the circumferential portions Eu or the corner portions Eau are pressured to adjust the porosity in Step S03, but the method of adjusting the porosity is not limited thereto.

For example, in the side margins, ceramic materials to be used may be different between the circumferential portion or the corner portion and the center portion. Specifically, the circumferential portion or the corner portion may be formed of a ceramic material whose ceramic particles have a smaller diameter than the diameter of ceramic particles of the ceramic material of the center portion. Further, the circumferential portion or the corner portion may be formed of a ceramic material having a smaller content of hyaline than the content of hyaline in the ceramic material of the center portion.

Alternatively, ceramics may be selectively deposited in the circumferential portion or the corner portion of the side margin on which debinding is performed to fill gaps generated by the debinding, thus reducing the porosity. Examples of the method of depositing ceramics include a spray dry method of spraying powder of ceramics, a spattering method, and a vacuum vapor deposition method.

Part of the processing in Step S06 described above may be performed before Step S04. For example, before Step S04, an unsintered electrode material may be applied to both the end surfaces of the unsintered ceramic body 111 that face in the X-axis direction, and in Step S06, the unsintered ceramic body 111 may be sintered and, simultaneously, the unsintered electrode material may be baked to form the base films of the first external electrode 14 and the second external electrode 15. Alternatively, the unsintered electrode material may be applied to the ceramic body 111 that has been subjected to debinding, to simultaneously sinter the unsintered electrode material and the ceramic body 111.

In those cases, the barrel polishing in Step S05 may be performed on the unsintered ceramic body 111.

For example, in the embodiments described above, the multi-layer ceramic capacitor has been described as an example of a multi-layer ceramic electronic component, but the present disclosure is applicable to any other multi-layer ceramic electronic components each including paired internal electrodes alternately disposed. Examples of such multi-layer ceramic electronic components include a chip varistor, a chip thermistor, a multi-layer inductor, and a piezoelectric element.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A multi-layer ceramic electronic component, comprising: a multi-layer unit that includes ceramic layers laminated in a first direction, and internal electrodes disposed between the ceramic layers, positions of end portions of the internal electrodes in a second direction orthogonal to the first direction being aligned with one another within a range of 0.5 m in the second direction; and a side margin that includes a center portion in the first direction and a third direction orthogonal to the first direction and the second direction, and corner portions in the first direction and the third direction, the corner portions having a lower porosity than a porosity of the center portion, the side margin covering the multi-layer unit from the second direction, wherein the side margin includes a circumferential portion including the corner portions and surrounding the center portion in the first direction and the third direction, the circumferential portion has a smaller porosity than a porosity of the center portion, and the side margin consists of a single layer.

2. The multi-layer ceramic electronic component according to claim 1, wherein
the corner portions have a porosity of 3% or less.

3. The multi-layer ceramic electronic component according to claim 2, wherein
the center portion has a porosity of 2% or more, and
the corner portions have a porosity of 1% or less.

4. The multi-layer ceramic electronic component according to claim 1, wherein
the side margin has a thickness of 30 μm or less in the second direction.

5. A method of producing a multi-layer ceramic electronic component, comprising: producing a multi-layer chip including ceramic layers laminated in a first direction, and internal electrodes disposed between the ceramic layers and exposed from a side surface of the multi-layer chip, the side surface facing in a second direction orthogonal to the first direction; and forming a side margin on the side surface of the multi-layer chip, the side margin including a center portion in the first direction and a third direction orthogonal to the first direction and the second direction, and corner portions in the first direction and the third direction, the corner portions having a lower porosity than a porosity of the center portion, wherein the side margin includes a circumferential portion including the corner portions and surrounding the center portion in the first direction and the third direction, the circumferential portion has a smaller porosity than a porosity of the center portion, and the side margin consists of a single layer.

6. The method of producing a multi-layer ceramic electronic component according to claim 5, wherein
the forming a side margin includes
forming an untreated side margin on the side surface of the multi-layer chip, the untreated side margin being formed of unsintered ceramics, and
pressuring, from the second direction, corner portions of the untreated side margin in the first direction and the third direction.

* * * * *

UNITED STATES PATENT AND TRADEMARK OFFICE
CERTIFICATE OF CORRECTION

Page 1 of 2

PATENT NO. : 11,437,194 B2
APPLICATION NO. : 16/874581
DATED : September 6, 2022
INVENTOR(S) : Yoichi Kato It is certified that error appears in the above-identified patent and that said Letters Patent is hereby corrected as shown below:

In the Claims

At Column 13, Line 28, in Claim 1, after the word "includes", the recitation starting with "ceramic layers" should begin on a new line.

At Column 13, Line 29, in Claim 1, after the word "and", the recitation starting with "internal electrodes" should begin on a new line.

At Column 13, Line 33, in Claim 1, the term "0.5m" should be "0.5 µm".

At Column 13, Line 33, in Claim 1, after the word "and", the recitation starting with "a side margin" should begin on a new line.

At Column 13, Line 34, in Claim 1, the recitation starting with "a center portion" should begin on a new line.

At Column 13, Line 36, in Claim 1, the recitation starting with "corner portions" should begin on a new line.

At Column 13, Line 38, in Claim 1, after the word "portion,", the recitation starting with "the side margin" should begin on a new line.

At Column 13, Line 39, in Claim 1, after the word "direction,", the recitation starting with "wherein" should begin on a new line.

At Column 13, Line 42, in Claim 1, after the word "direction,", the recitation starting with "the circumferential portion" should begin on a new line.

At Column 14, Line 2, in Claim 1, after the word "and", the phrase starting with "the side margin" should begin on a new line.

Signed and Sealed this
Twenty-seventh Day of December, 2022

Katherine Kelly Vidal
*Director of the United States Patent and Trademark Office*

CERTIFICATE OF CORRECTION (continued)
U.S. Pat. No. 11,437,194 B2

At Column 14, Line 15, in Claim 5, after the word "comprising:", the recitation starting with "producing" should begin on a new line.

At Column 14, Line 16, in Claim 5, after the word "including", the recitation starting with "ceramic layers" should begin on a new line.

At Column 14, Line 17, in Claim 5, the recitation starting with "internal electrodes" should begin on a new line.

At Column 14, Line 20, in Claim 5, after the word "and", the recitation starting with "forming" should begin on a new line.